May 15, 1962   CLAES-WILHELM PILO ET AL   3,034,730
MEANS FOR THE DISTRIBUTION OF A LIQUID ON ROTATING SURFACES
Filed Sept. 23, 1958                         6 Sheets-Sheet 1

CLAES-WILHELM PILO
and SVEN WILHELM DAHLBECK
INVENTORS
BY
ATTORNEY.

CLAES-WILHELM PILO
and SVEN WILHELM DAHLBECK
INVENTORS.

BY

ATTORNEY

CLAES-WILHELM PILO
and SVEN WILHELM DAHLBECK
INVENTORS.

BY Albert M. Parker
ATTORNEY.

May 15, 1962  CLAES-WILHELM PILO ET AL  3,034,730
MEANS FOR THE DISTRIBUTION OF A LIQUID ON ROTATING SURFACES
Filed Sept. 23, 1958  6 Sheets-Sheet 6

CLAES-WILHELM PILO
and SVEN WILHEM DAHLBECK
INVENTORS.
BY
ATTORNEY.

United States Patent Office 3,034,730
Patented May 15, 1962

3,034,730
MEANS FOR THE DISTRIBUTION OF A LIQUID ON ROTATING SURFACES
Claes-Wilhelm Pilo, Lovisagatan 2, Stockholm, Sweden, and Sven Wilhelm Dahlbeck, Djursholm, Sweden; said Dahlbeck assignor to said Pilo
Filed Sept. 23, 1958, Ser. No. 762,874
Claims priority, application Sweden Sept. 27, 1957
8 Claims. (Cl. 239—222)

This invention relates to means for the distribution of a liquid on rotating surfaces in a contact zone of a rotor arranged for causing intimate contact between gas and liquid. The rotating surfaces are mounted on a rotor in an apparatus which may be called a centrifugal absorber, although the apparatus may be used not only as absorption apparatus, but also as a desorption or distillation apparatus, as heat exchanger or separator for dust or drops. The invention can be applied for all of these types of apparatus having a horizontal, vertical or inclined axis of rotation, but as a practical example it will only be described below with reference to embodiments having a vertical axis of rotation. Furthermore, it may be mentioned that the expression "gas" in this connection is also considered to include vapor.

The type of apparatus to which the invention refers consists of a rotor, enclosed in a rigid casing and rotating around an axis of rotation. The peripheral part of the rotor, the contact zone, contains the surfaces across which the gas is brought into close contact with the liquid flowing on the surfaces. The liquid is supplied to the part of the contact zone which is closest to the axis of rotation and is caused to flow across the surfaces in the direction towards the periphery of the rotor under the action of the centrifugal force. The gas flows in the same direction as or in countercurrent to the liquid in the spaces between said surfaces. The surfaces, which can be arranged irregularly or regularly, consist, for example, of filler bodies of a suitable type, or rigid laminar surfaces or plates which can either be parallel or almost parallel to the axis of rotation, or also at right angles or approximately at right angles to this axis, but can also form any other angle from 0° to 90° with an axial plane. The rigid surfaces can be smooth or suitably corrugated or folded, or otherwise have an uneven surface structure. They can be plane or curved and parallel to one another or form an angle with one another.

Many types of such centrifugal absorbers have been suggested and tried, but hitherto the results have not fulfilled expectations. The investigations which have resulted in the present invention have shown that the unsatisfactory results were largely due to the fact that the liquid was not distributed continuously and evenly enough on the surfaces of the contact zone. On closer consideration it appears to be natural, in view of the strong centrifugal force which forces the liquid rapidly towards the periphery of the rotor, that the liquid must at every moment be supplied evenly along the entire inner periphery of the contact zone as well as over its entire height if it is desired to get the surfaces of the contact zone as continuously and uniformly moistened or wetted as possible.

It is also evident that a considerable deterioration in the efficiency of the centrifugal absorber—the number of theoretical bottoms—arises at an early stage if a minor part of the contact zone is not being moistened continuously with the liquid, as in such a case gas can pass the non-moistened parts without coming in contact with the liquid.

Hitherto, the problem of supplying liquid to the contact zone has been solved by arranging within the inner periphery of the annular contact zone one or several stationary places at which the liquid flows out towards the outer periphery of the contact zone. To prevent unsatisfactory distribution of the liquid along the periphery several such places have been arranged so as to receive equally large quantities of liquid. In order to prevent unsatisfactory vertical distribution of the liquid the latter has, for instance, been discharged at said places from spraying nozzles, or vertical pipes having a plurality of apertures or holes directed towards the contact zone or having a longitudinal slot facing this contact zone. A fully continuous and uniform distribution of the liquid cannot, however, be attained in this way, and the parts of the contact zone which are located nearer the centre of the rotor will lose part of its liquid during the passage from one supply place to another. The disadvantages of an uneven distribution of liquid are particularly noticeable in centrifugal absorbers having contact zones comprising slots between plane or curved plates. With horizontal plates (at right angles to the axis of rotation) it is consequently absolutely necessary for the liquid to be distributed in perfect uniformity vertically as the liquid cannot move from one slot to another in passing through the contact zone. A uniform distribution is, however, most important also with vertical or approximately vertical plates as the above-mentioned investigations have shown that liquid which has been supplied at one place has a very little tendency to be distributed upwards and downwards on the plate while flowing towards the periphery.

The methods of distributing the liquid now described have also the following drawback, which, in a number of cases, can be of decisive importance. By supplying the liquid at fixed places while the inner periphery of the contact zone, rotating at a high speed, passes these places, there will be a powerful impact between the liquid and the contact surfaces rushing past, the liquid being hereby broken up into fine drops which—when the gas passes in counter-current to the liquid—is very apt to be carried along by the gas current and discharged from the absorber. Attempts have been made to prevent this phenomenon by arranging, immediately inside the inner periphery of the contact zone, horizontal plates fixed to this periphery on which the liquid is swished up at the rotating speed of the rotor. Satisfactory results have not, however, been obtained in this way.

The main object of the present invention is to overcome the above-mentioned drawbacks. The method according to the invention is mainly characterized by the fact that the liquid close to the centre of the rotor is provided with one or several sprayers which have a rotating movement independent of, but around the same geometrical axis as the rotor of the apparatus, and that the liquid while moving outwards from the axis of rotation of the sprayer, is accelerated to an ever-increasing peripheral speed, after which the liquid, under the action of the centrifugal force, is spread in a direction approximately parallel to the axis of rotation by means of guiding surfaces and/or tubular means connected to and rotating with the sprayer to be ejected from guiding surfaces or tubular means against the rotor of the apparatus so as to be distributed over the height and inner periphery of the apparatus. A suitable arrangement for carrying out this method according to the invention preferably comprises a plane, almost plane and/or cup-shaped plate, trough or such like, rotating around an axis with the same centre as the rotor but independently of this rotor, a number of guiding surfaces and/or pipes being fixed in a circular row along the outer periphery of the cup or trough essentially parallel to or sloping outwards from this cup or trough.

The speed of rotation of the sprayer can be higher or lower than that of the rotor but can also, if desired, be as great as that of the rotor. The rotation can be in the same, or in the opposite direction to that of the rotor.

The liquid is supplied as close as possible to the centre of the bottom of the sprayer, which approximately lies at the same level as the lower edge of the contact zone attached to the rotor. This bottom can, if desired, be provided with bars or similar carrier surfaces which can be parallel to a plane at right angles to the axis of rotation, or can in certain cases entirely or partly form an angle with this plane. By means of these carrier surfaces, or possibly by the friction against the bottom alone the liquid will be accelerated during its passage from the centre towards the periphery of the sprayer, to an ever-increasing peripheral speed—often approximately the same as the speed of the sprayer at corresponding points. The liquid is subsequently caused to rise up along the guiding surfaces which are arranged, for example vertically or almost vertically, along the periphery of the sprayer, said surfaces being of such a nature—for example arranged diagonally and/or tapering upwards in triangular shape or the like and/or fitted with oblique slots and/or with grooves—that the liquid will leave these surfaces uniformly along the entire height, which is approximately equal to that of the contact zone. The uniform distribution in vertical direction can either be continuous or discontinuous with, in the latter instance, short distances between the points where the liquid leaves the approximately vertical carrier surfaces.

In certain cases when the contact zone for example consists of vertical or almost vertical plates with intervening grooves, it is in most cases necessary to have the sprayer rotating at a higher rotational speed than the rotor. It must then be provided with a separate shaft which can lie inside or outside the shaft of the rotor, or be mounted into the absorber from the opposite direction to the shaft of the rotor.

If desired, several sprayers may also be arranged along the axis of rotation to spread the fluid across the height and inner periphery of the rotor. Then again the rotor can be made to rotate entirely or partly with the aid of the energy of movements of the drops of liquid when these leave the sprayer and strike the rotor at a greater peripheral speed than the rotor has at the points where the drops strike this.

Some embodiments of an arrangement according to the invention are shown diagrammatically in the accompanying drawings.

Figure 1:
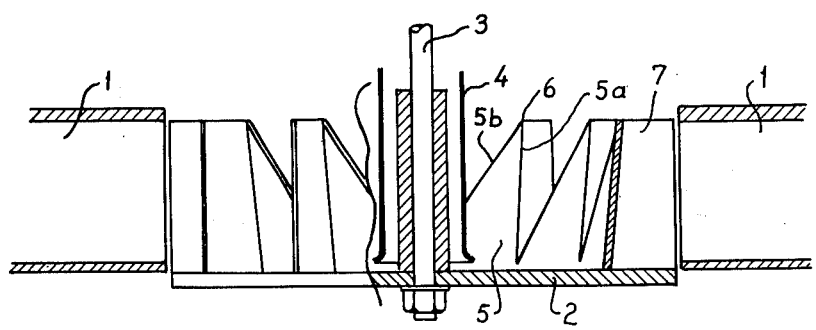
FIGS. 1 and 2 show one embodiment in side view, partly in section and from above, respectively.
Figure 2:
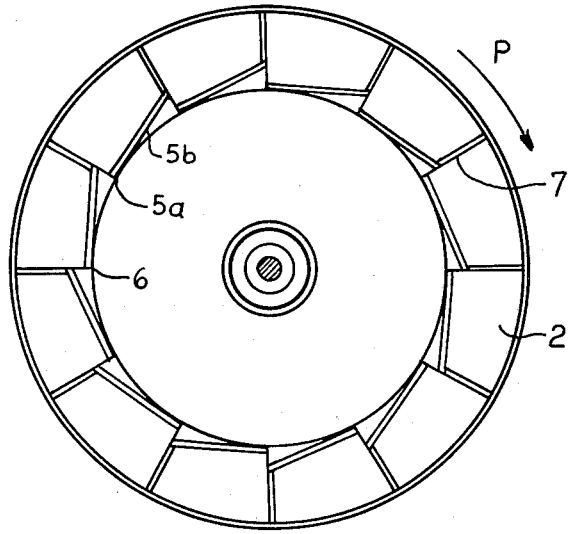
Figure 3:
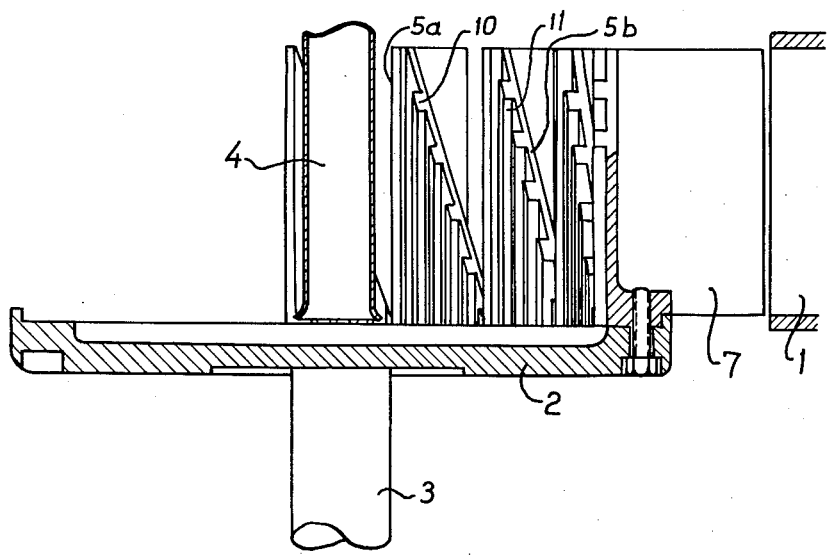
FIGS. 3 and 4 show another embodiment in a corresponding manner.
Figure 4:
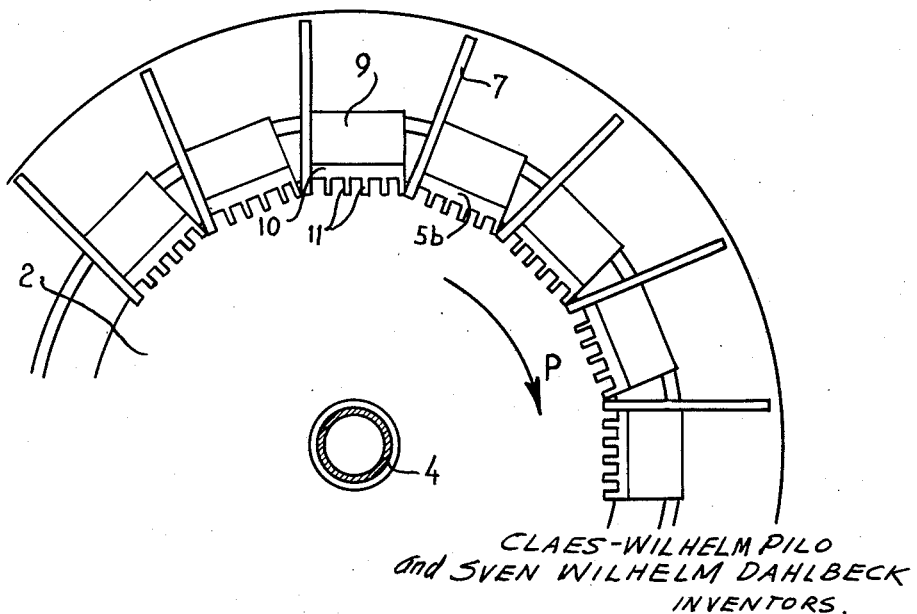
Figure 5:
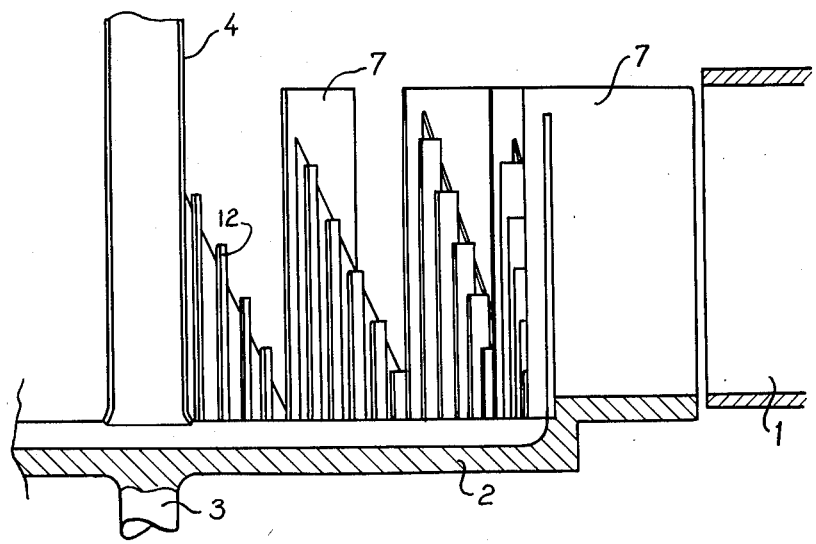
FIGS. 5 and 6 show a third embodiment in a similar manner.
Figure 6:
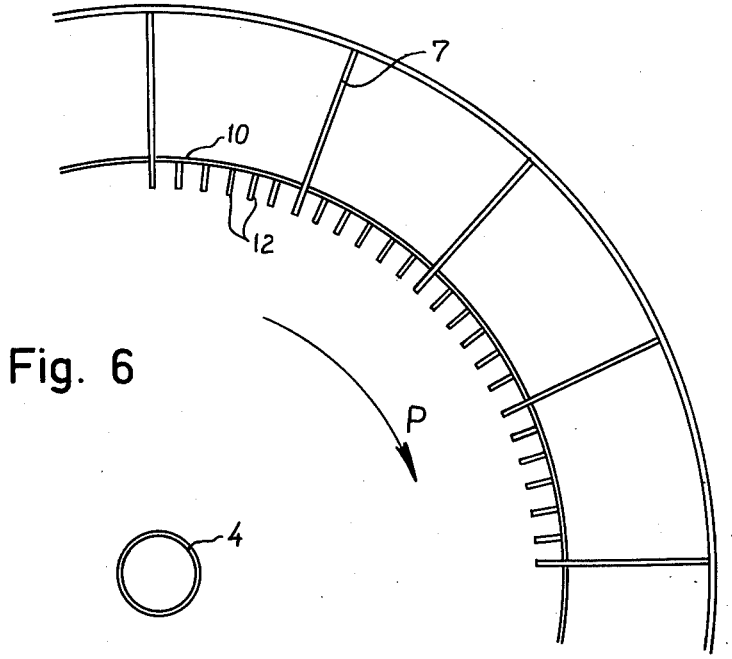
Figure 7:
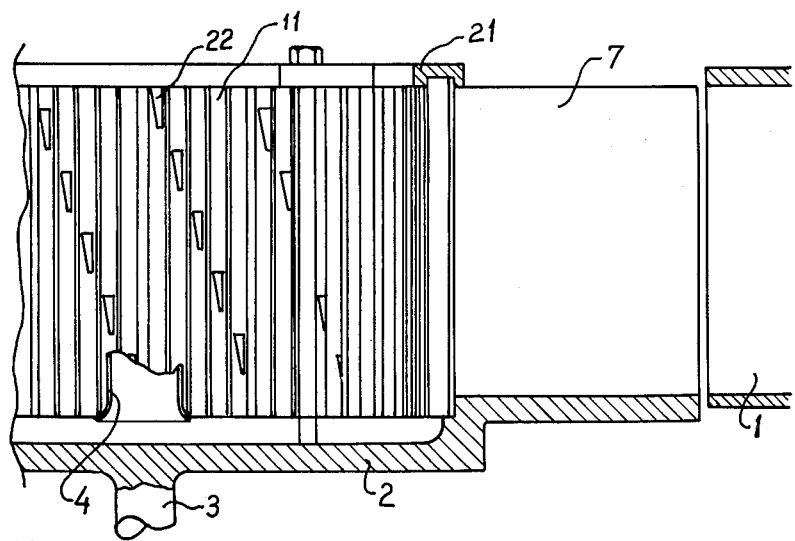
FIGS. 7 and 8 show a fourth embodiment in a similar manner.
Figure 8:
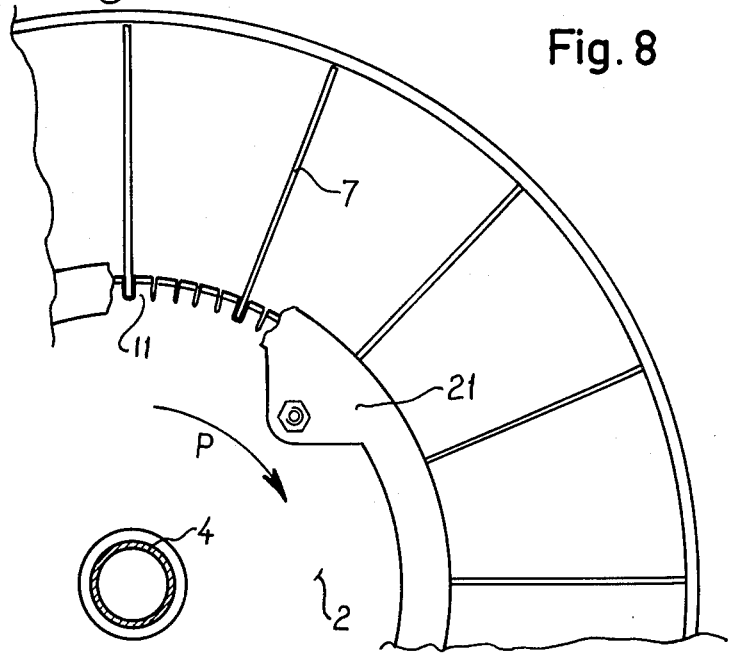
Figure 9:
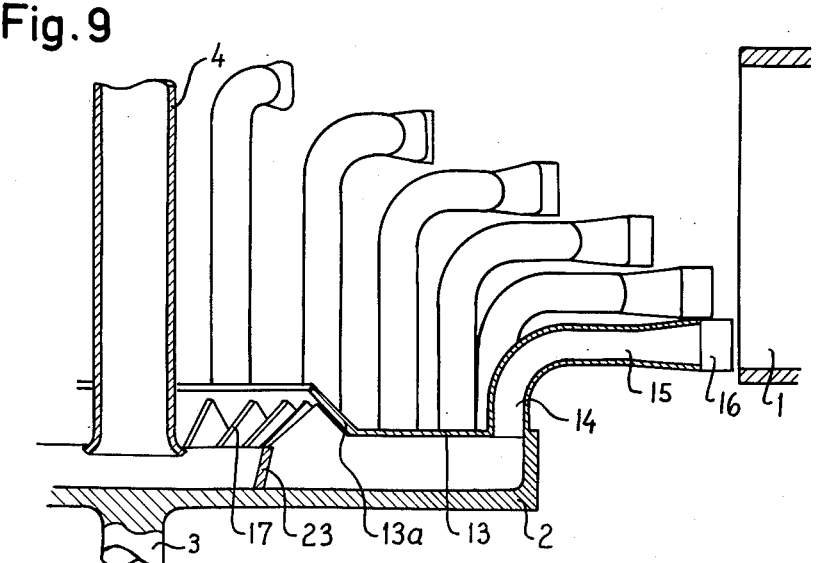
FIGS. 9 and 10 show a fifth embodiment in a similar manner.
Figure 10:
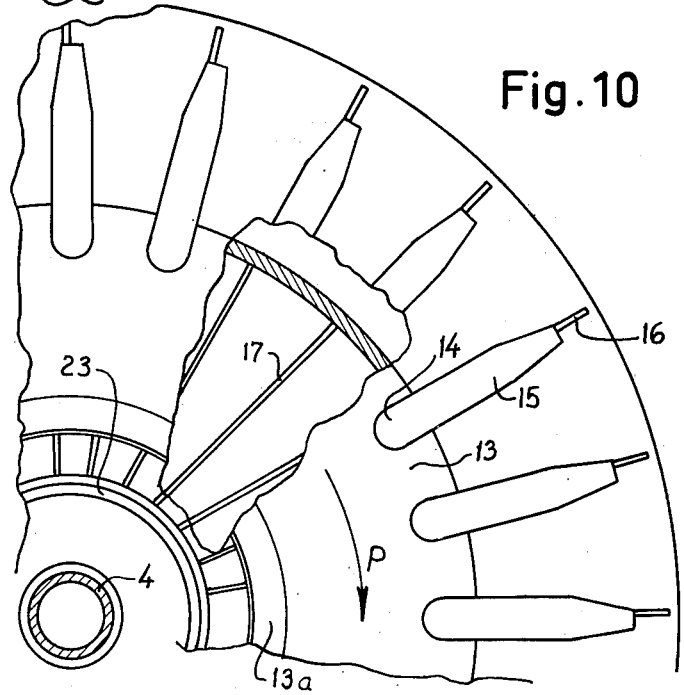

FIGS. 1 and 2 of the drawings show the part 1 nearest the axis of rotation of the annular rotor, that is the inner portion of the contact zone, in this case consisting of lamellae or plates, although filler bodies can of course also be used. The shaft of the rotor is not shown. The sprayer, which is located inside rotor 1, consists of a plate or cup 2, arranged to rotate at the desired speed and in the desired direction (for example in the direction of the arrow P) by means of a shaft 3. Round this shaft 3 there is arranged a pipe 4 for the supply of the liquid. With its lower end this pipe emerges close to the centre of cup 2. Farther out on the cup 2 an essentially cylindrical, conical or cup-shaped surface 5 is arranged for uniform distribution of the liquid along the periphery of the sprayer. According to FIGS. 1 and 2 this surface consists of a number of mainly triangular guiding surfaces arranged in a circular row, with the base arranged so that the liquid which is distributed uniformly over it is caused to rise upwards along the triangular surface in the direction towards its apex 6. The bottom of cup 2 can be provided with fixed carrier surfaces, which are not shown but which give the liquid a speed which is as large, or nearly as large as the peripheral speed of the cup 2. These carrier surfaces may be provided with a roof so as to prevent the liquid from splashing up.

The triangle sides of guiding surfaces 5 can have the same mutual slope, but side *5a* can also, as shown in FIG. 1, be essentially vertical and the other side *5b*, which is leading in the direction of rotation, can be sloping. The inner side of the guiding surfaces facing shaft 3 may have grooves which preferably are parallel or almost parallel to shaft 3. As will be seen from FIG. 1 surfaces 5 slope slightly outwards from the shaft 3. On the side of the guiding surfaces facing the periphery guiding surfaces 7 are arranged parallel or almost parallel to shaft 3.

During the rotation of the sprayer the supplied liquid will flow outwards on the bottom of cup 2 so as to be distributed uniformly along its periphery at the base of the triangular surfaces 5, at the same time as the liquid while flowing outwards will obtain approximately the same peripheral speed as the cup. The liquid rises upwards along the surfaces 5, flows across on to guiding surfaces 7 and is distributed uniformly on these surfaces in a vertical direction, and subsequently the liquid is ejected against the inner periphery of the rotating rotor 1 and is distributed on the surfaces of the rotor along the entire periphery and alongside the entire height of the contact zone. At the same time the gas is conveyed across the surfaces of the rotor which are thus coated with thin layers of liquid so that the gas will flow in contact with these in the same direction as or in countercurrent to the liquid towards the periphery of surfaces 1.

Guiding surfaces 7 may be radial or form an angle with the radius. Surfaces 5 need not, of course, terminate in a point or apex at the top, but they may also be more or less rounded off. Similarly, the lateral edges of surfaces 5 need not be straight, but can be curved or uneven.

FIGS. 3 and 4 show a somewhat modified embodiment in which the axis of rotation 3 is connected to the underside of the cup 2. Every guiding plate is associated with a base plate from which the guiding surface 7 departs, and every guiding surface has a number of grooves 11 on the inside.

FIGS. 5 and 6 show how the grooves can be formed between lamellae or ribs 12 on the inside of surfaces 10.

FIGS. 7 and 8 show how these plates or lamellae can be formed from a corrugated sheet metal which is clamped between the base plate and a grooved clamping ring 21. Each groove 11 is provided with apertures or perforations 22 through which the liquid is ejected towards the guiding surfaces 7. In order to secure the best possible distribution of the liquid vertically the apertures 22 in the corresponding grooves of the individual sectors may be slightly off-set or displaced vertically so that they will not register with one another, as shown in FIG. 7. The inclination of the plate may be varied if the groove of the clamping ring 21 has varying diameters.

FIGS. 9 and 10 show a further embodiment in which the grooves are replaced by pipes 14, for instance having an essentially horizontal part 15 at the end of which the pipes open close to the guiding surfaces 16, which correspond to the guiding surfaces 7 previously described. The pipes preferably open at varying heights near the inner periphery of rotor 1 so that the liquid is, on the whole, distributed uniformly along the height of the contact zone of the rotor 1. This arrangement of the pipe outlets at different heights corresponds in principle to the sloping edge *5b* of the guiding surfaces 5 according to FIGS. 1 to 4. At the foot a roof 13 can be arranged to cover part of the bottom of cup 2 to prevent splashing of the liquid. At the centre this roof can be connected to a wall 13a sloping upwards. FIGS. 9 and 10 show how the bottom of cup 2 can be provided with carrier ribs or bars 17, or such like, beneath roof 13. The inner ends of pipes 18 open close to these bars 17. In this case pipes 18 have no vertical part 14.

Figure 11:
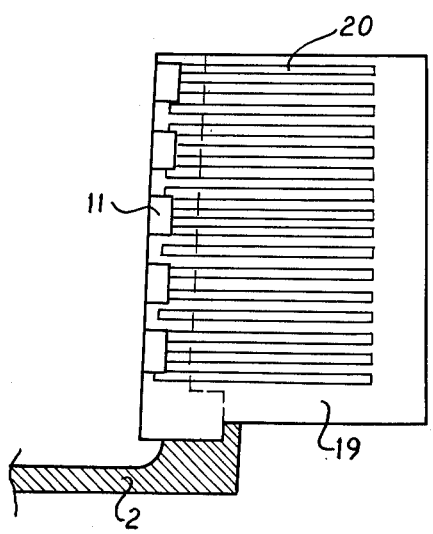
FIGS. 11, 12 and 13 show different embodiments of a part of the outer periphery of the sprayer in side view.
Figure 12:
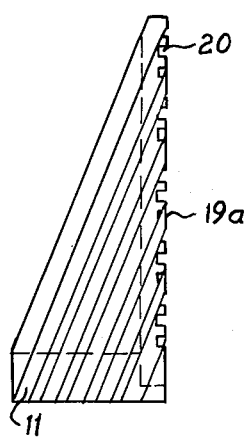
Figure 13:
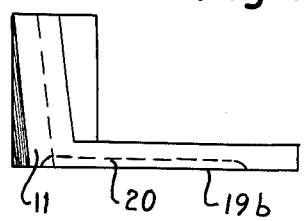

FIGS. 11, 12 and 13 show an embodiment with guiding surfaces 19, 19a and/or 19b (corresponding to surfaces 7 and/or 16), provided with grooves 20 at right angles to shaft 3 along a part of or its entire length to prevent the liquid deflecting upwards or downwards during its flow towards the periphery.

Aside from the specific variations now described, other alternative forms of structure and details will be apparent to those skilled in the art.

What we claim is:

1. A spraying apparatus for distribution of liquid medium, comprising in combination a rotatable substantially plate-shaped body, means for supplying liquid medium to the central portion of said body, said body, on rotation thereof, acting to force such liquid medium towards the periphery thereof by centrifugal force, while distributing said liquid medium peripherally, guiding means projecting in upward direction at the periphery of said body, said guiding means being formed with grooves on the surface thereof for guiding said liquid medium in upward direction to different levels at different points of said periphery and for causing said liquid medium to leave said guiding means at different levels, at points distributed along a line at an angle to the longitudinal direction of said grooves.

2. A spraying apparatus as in claim 1, wherein said grooves end at different levels of said guiding means.

3. A spraying apparatus as in claim 1 wherein said guiding means is formed with a sloping free edge and said grooves end at said sloping free edge.

4. A spraying apparatus as in claim 1 wherein said body is substantially cup shaped.

5. A spraying apparatus as in claim 1 wherein upward projections are provided at the bottom of said body for entraining said liquid medium.

6. A spraying apparatus for uniform distribution of liquid on an annular gas-liquid contact rotor, comprising in combination a substantially plate-shaped body rotating concentrically within said annular rotor so as to force liquid received at the central portion of said body to the periphery thereof under the action of centrifugal force, first guiding surfaces on said body having a substantially saw-tooth-like outline and extending in upward direction at the periphery of said body to different levels at different points of said periphery so as to cause the liquid to leave said body at different levels, the difference in height between the uppermost and lowermost points of said outline defining the height of the zone within which the liquid will be distributed, and substantially radially extending second guiding surfaces extending radially outwardly with respect to said first grinding surfaces and receiving said liquid moving outwardly at different levels so as to distribute said liquid in vertical direction at said levels there being a free unobstructed space above the top edges of said second guiding surfaces to permit gas to pass upwardly past and beyond said second surfaces.

7. A spraying apparatus for distribution of liquid medium on the inner periphery of an annular rotor, comprising in combination a rotatable substantially plate-shaped body, means for supplying liquid medium to the central portion of said body, said body on rotation thereof acting to force such liquid medium towards the periphery thereof by centrifugal force, while distributing said liquid medium peripherally, first guiding means projecting in upward direction at the periphery of said body for conducting liquid carried to said periphery in upward direction to different levels at different points of the periphery, substantially radially extending second guiding means defining passages between themselves, said second guiding means receiving said liquid leaving said body so as to distribute it vertically, and said passages opening vertically to form discharge spaces for allowing gas from said rotor to escape in substantially vertical direction after having entered said passages.

8. A spraying apparatus for uniformly distributing liquid comprising a substantially cup-shaped rotating body receiving liquid at its central portion for forcing such liquid towards its periphery by centrifugal force, first guiding means at the periphery of said body for conducting liquid at said periphery in upward direction to different levels, and substantially radially directed second guiding means on said body for receiving said liquid flowing radially in outward direction so as to distribute said liquid over a broad horizontal range and said second guiding means being formed with substantially horizontally directed grooves therein for guiding the direction of flow of said outwardly flowing liquid during its travel along said second guiding means.

References Cited in the file of this patent

UNITED STATES PATENTS

| | | |
|---|---|---|
| 1,647,918 | Kreuder | Nov. 1, 1927 |
| 2,220,275 | Preston | Nov. 5, 1940 |
| 2,259,011 | Taylor | Oct. 14, 1941 |
| 2,545,490 | Norris | Mar. 20, 1951 |
| 2,815,246 | Nyrop | Dec. 3, 1957 |
| 2,850,322 | Ingram | Sept. 2, 1958 |
| 2,902,223 | Nyrop | Sept. 1, 1959 |

FOREIGN PATENTS

| | | |
|---|---|---|
| 349,844 | Germany | Mar. 9, 1922 |
| 658,687 | Great Britain | Oct. 10, 1951 |
| 911,116 | Germany | May 10, 1954 |